(12) United States Patent
Hwang (10) Patent No.: US 9,268,987 B2
(45) Date of Patent: *Feb. 23, 2016

(54) METHOD OF RECOGNIZING QR CODE IN IMAGE DATA AND APPARATUS AND METHOD FOR CONVERTING QR CODE IN CONTENT DATA INTO TOUCHABLE OBJECT

(71) Applicant: KOREA ADVANCED INSTITUTE OF SCIENCE AND TECHNOLOGY, Daejeon (KR)

(72) Inventor: Sungjae Hwang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,973

(22) Filed: Apr. 23, 2015

(65) Prior Publication Data

US 2015/0278573 A1 Oct. 1, 2015

Related U.S. Application Data

(63) Continuation of application No. 13/845,776, filed on Mar. 18, 2013, now Pat. No. 9,027,837.

(30) Foreign Application Priority Data

Jul. 23, 2012 (KR) .................. 10-2012-0079924

(51) Int. Cl.
G06K 7/10 (2006.01)
G06K 7/14 (2006.01)
G06F 17/30 (2006.01)
G06K 19/06 (2006.01)

(52) U.S. Cl.
CPC ........ *G06K 7/1443* (2013.01); *G06F 17/30247* (2013.01); *G06F 17/30879* (2013.01); *G06K 7/1417* (2013.01); *G06K 19/06037* (2013.01); *G06K 19/06112* (2013.01)

(58) Field of Classification Search
USPC ........... 235/462.01, 379, 375, 380; 705/3, 16, 705/26.1, 28
See application file for complete search history.

(56) References Cited

U.S. PATENT DOCUMENTS

| 9,027,837 | B2 * | 5/2015 | Hwang ............. G06F 17/30247 235/462.09 |
| 2013/0062402 | A1 | 3/2013 | Cok et al. |
| 2013/0246584 | A1 | 9/2013 | Barton et al. |
| 2013/0290234 | A1 | 10/2013 | Harris et al. |
| 2013/0341401 | A1 | 12/2013 | Kannan et al. |

* cited by examiner

*Primary Examiner* — Christle I Marshall
(74) *Attorney, Agent, or Firm* — Paratus Law Group, PLLC

(57) ABSTRACT

Provided are a method of recognizing a quick response (QR) code in image data, and an apparatus and method for converting a QR code in content data into a touchable object. The method of converting a QR code in content data into a touchable object includes a step in which a computer device receives content data including a QR code, a step in which the computer device recognizes the QR code in the content data, and a step in which the computer device converts an image in which the QR code is shown into a touchable object for executing a command included in the QR code. The converting step includes interpreting, at the computer device, the command included in the recognized QR code, and modifying, at the computer device, a code of the content data to convert the image into the touchable object for executing the command.

19 Claims, 12 Drawing Sheets

METHOD OF RECOGNIZING QR CODE IN IMAGE DATA AND APPARATUS AND METHOD FOR CONVERTING QR CODE IN CONTENT DATA INTO TOUCHABLE OBJECT

CROSS-REFERENCE TO RELATED APPLICATION

This application is a Continuation Application of U.S. patent application Ser. No. 13/845,776 filed Mar. 18, 2013, which claims priority to and the benefit under 35 U.S.C §119 (a) of Korean Patent Application No. 2012-0079924, filed on Jul. 23, 2012, in the Korean Intellectual Property Office, which are all hereby incorporated by reference in their entirety.

BACKGROUND

1. Field

The following description relates generally to a method of recognizing a quick response (QR) code in image data, and an apparatus and method for converting a QR code in content data into a touchable object.

2. Description of Related Art

With the proliferation of smart phones, a variety of services using QR codes have recently been provided. A QR code is a two-dimensional code having various pieces of information in a quadrilateral grid. While an existing one-dimensional (ID) bar code can only store numerical information of about 20 digits, a QR code can store several thousands of digits or letters and also has a superior recognition speed, recognition rate and restorability of stored data in a QR code to a general bar code.

A QR code is provided in the form of an image that is output in a document or on a display device. A user photographs the QR code using a camera installed in a device such as a smart phone, and accesses information stored in the QR code by decoding the photographed information. To decode the QR code, the user generally utilizes an additional camera.

SUMMARY

In one general aspect, there is provided a method of recognizing a quick response (QR) code in image data including: displaying, at a computer device, an image including a QR code through a display device including a touch panel; receiving, at the touch panel, a signal for selecting a region in which the QR code is shown; and recognizing, at the computer device, the QR code from the image.

The signal may be a touch signal for the region in which the QR code is shown, or a gesture for selecting the region in which the QR code is shown.

The recognizing the QR code may include: when the signal is a touch signal for the region in which the QR code is shown searching for a standard QR code pattern in a search region of the image while extending the search region centering on a region in which the touch signal is input; and recognizing the QR code based on the searched standard QR code pattern.

The searching for the standard QR code pattern may include acquiring data of the image per pixel while moving a target pixel in a spiral direction from a central point of the region in which the touch signal is input.

The standard QR code pattern may be at least one of a timing pattern, an alignment pattern, and a plurality of position patterns.

The method of recognizing a quick response (QR) code in image data may further include storing, at the computer device, data included in the QR code in a memory of the computer device The method of recognizing a quick response (QR) code in image data may further include interpreting, at the computer device, a vibration pattern command included in the QR code; and vibrating, at the display device, according to the vibration pattern command.

The image may be included in a web page displayed on the display device or content of an application.

In another aspect, there is provided a method of converting a quick response (QR) code in content data into a touchable object including: receiving, at a computer device, content data including a QR code; recognizing, at the computer device, the QR code in the content data; and converting, at the computer device, an image in which the QR code is shown into a touchable object for executing a command included in the QR code.

The recognizing the QR code may include detecting image data in the content data; and determining the QR code in the image data.

The converting the image may include interpreting the command corresponding to the recognized QR code; and converting a code of the content data to convert the image into the touchable object for executing the command.

The content data may be made up of Hypertext Markup Language (HTML), in case of that the recognizing the QR code may include searching the HTML of a code for inserting the image to recognize the QR code, and the converting the image may include interpreting the command of the QR code and then converting the inserting code into a code for a link to a touchable icon for executing the command.

The method of converting a quick response (QR) code in content data into a touchable object may be further include displaying, at a display device connected with the computer device, the touchable object, wherein the touchable object is at least one of a QR code type, a text type, and a button type.

The receiving the content data may include generating, at the computer device, the QR code including information stored in a memory; and placing, at the computer device, the generated QR code into the content data.

In another general aspect, there is provided a method of generating content data including a quick response (QR) code, including: displaying, at a computer device, content of an application through a display device including a touch panel; receiving, at the touch panel, a QR code generation signal; generating, at the computer device, a QR code including data stored in a memory; and placing, at the computer device, the QR code into the content.

The generating the QR code may include storing the data in a cloud server through wireless communication, and generating the QR code including a key for accessing the cloud server when the data exceeds a storage capacity of the QR code.

The application may be at least one of a mail application, a social networking service (SNS) application, a messenger application, and a web page building application, and the placing the QR code may include, modifying, at the computer device, a code of the content so that the QR code is included in the content as an image.

In yet another general aspect, there is provided a An apparatus for converting a quick response (QR) code in content data into a touchable object, including: a memory configured to receive content data including a QR code; a processor configured to recognize the QR code in the content data, and convert the QR code in the content data into a touchable object for executing a command included in the QR code; and a communication module configured to transmit the content data including the converted QR code.

The processor may detect image data in the content data, and determine the QR code in the image data.

The processor may determine a standard QR code pattern in the image data through image analysis.

The processor may interpret the command corresponding to the recognized QR code, and modify a code of the content data to include the touchable object for executing the command.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The presently described examples will be understood by reference to the drawings, wherein like parts are designated by like numerals throughout. The drawings are not necessarily drawn to scale, and the size and relative sizes of the layers and regions may have been exaggerated for clarity.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Before starting detailed explanations of figures, components that will be described in the specification are discriminated merely according to functions mainly performed by the components or conventionally carried out according to common knowledge of related technical fields. That is, two or more components which will be described later can be integrated into a single component. Furthermore, a single component which will be explained later can be separated into two or more components. Moreover, each component which will be described can additionally perform some or all of a function executed by another component in addition to the main function thereof. Some or all of the main function of each component which will be explained can be carried out by another component. Accordingly, presence/absence of each component which will be described throughout the specification should be functionally interpreted.

A quick response (QR) code is in a form of an image that is output in a document or included in digital content such as a web page. Thus, a user photographs the QR code using a camera installed in a device such as a smart phone, and the photographed data is decoded by a computer device such as a smart phone.

Recently, mobile devices such as smart phones and tablet personal computers (PCs) have become popular. Most mobile devices employ interfaces based on a touch pad. A user searches the Internet using a mobile device, or is provided with a specific service by executing an application. At this time, when a QR code is shown in a web page or specific content displayed in a browser, the user needs to check information stored in the QR code using an additional mobile device.

In order for a user to easily check a QR code displayed in a mobile device, the present invention may provide an apparatus and method for converting a QR code in the form of an image into a touchable object. Also, the present invention may provide a method of recognizing a QR code shown in a web page, etc. with other content separately from the other content.

The present invention may be not only applied to mobile devices. The present invention can be applied to computer devices including a touch panel for a wide range of uses. Also, a method of recognizing a QR code can be applied to a computer device, a server, etc. including a processor.

Before detailed description of the present invention, terminology used in common will be defined first. A QR code is shown in a web page, an e-book, a video, a specific application, and so on. Various pieces of content in which QR codes are shown are referred to as digital content. Also, data constituting digital content is referred to as content data.

Figure 1:
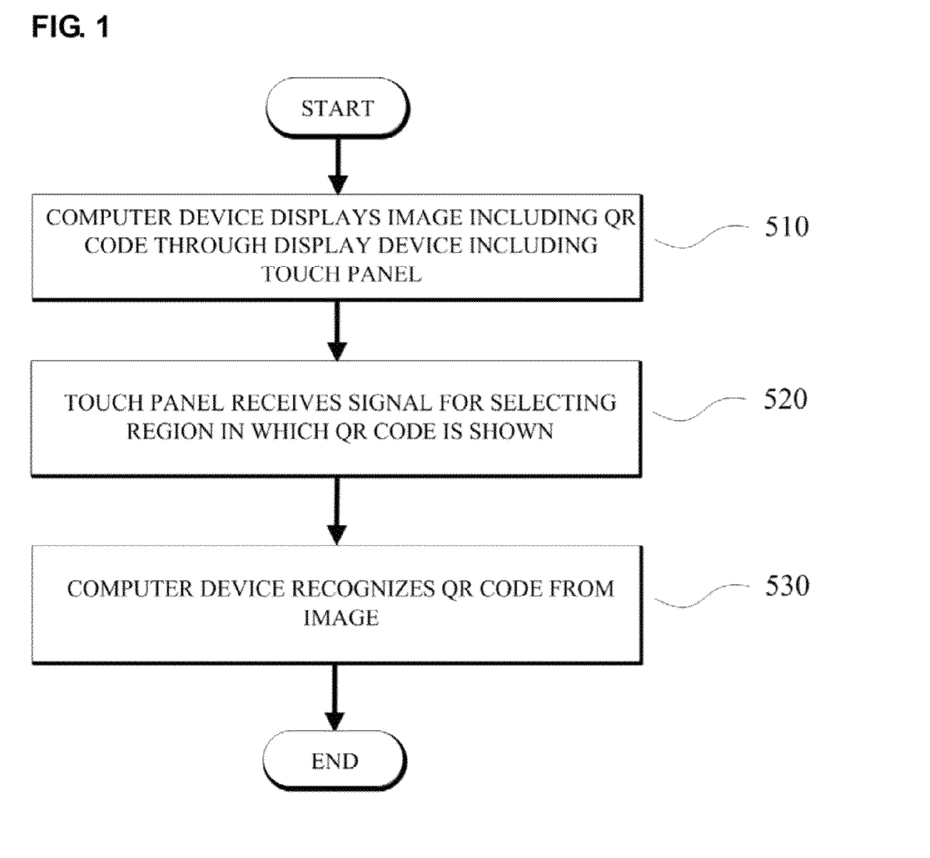
FIG. 1 is a flowchart illustrating an example of a method of recognizing a quick response (QR) code in image data.
Figure 2:
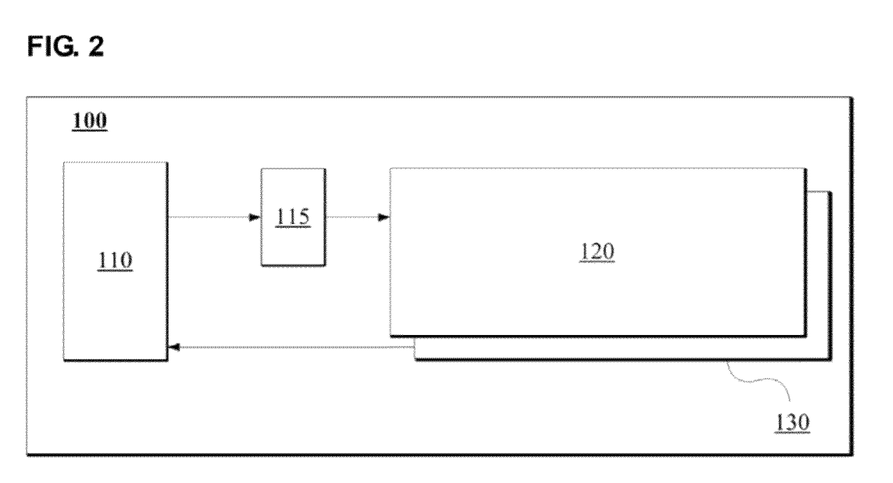
FIG. 2 is a block diagram illustrating an example of an apparatus for recognizing a QR code in image data.

FIG. 1 is a flowchart illustrating an example of a method of recognizing a quick response (QR) code in image data. FIG. 2 is a block diagram illustrating an example of an apparatus for recognizing a QR code in image data. In digital content, a QR code is presented as image data. Thus, there is a need for a method of recognizing a QR code in image data.

A method of recognizing a QR code in image data includes a step in which a computer device 100 displays an image including a QR code through a display device 120 including a touch panel 130 (510), a step in which the touch panel 130 receives a signal for selecting a region in which the QR code is shown (520), a step in which the computer device 100 recognizes the QR code separately from the image (530).

The computer device 100 denotes a smart phone, a tablet PC, a general PC, etc., and the display device 120 denotes an output device connected with the computer device 100. In general, a smart phone, a tablet PC. etc. is integrated into one body with the display device 120, as shown in FIG. 2. In the drawings of the present invention, description will be made using a smart phone or a tablet PC as an example of the computer device 100.

Referring to FIG. 2, the computer device 100 includes a processor 110 that processes various calculations, a memory that stores results processed by the processor 110 or data to be processed by the processor 110, the display device 120 that outputs results calculated by the processor 110, and the touch panel 130 that is included in the display device 120 to receive a touch input. FIG. 2 shows only a constitution necessary for description of the present invention. A signal input to the touch panel 130 is transferred to the processor 110, and data processed by the processor 110 is generally transferred to the display device 120 via the memory 115 or a cache.

A calculation process such as image analysis performed by the computer device 100 means that the process is performed by the processor 110 corresponding to a central processing unit (CPU).

In the receiving step (520), a user touches the region in which the QR code is shown, or inputs a gesture for selecting the region in which the QR code is shown. When the user touches the QR code displayed on the display device 120 or inputs a specific gesture for selecting the region in which the QR code is shown, the computer device 100 recognizes the QR code in image data. The specific gesture may be set in advance, or various gesture inputs set by the user may be used.

In the computer device 100 employing the touch panel 130 as an input device, touch inputs are used for general commands as well. Thus, it is preferable for the user to distinguish a touch command for recognizing a QR code from a general touch input. The user who uses the computer device 100 may set a QR code recognition mode before making a touch input for recognizing a QR code.

Figure 3A:
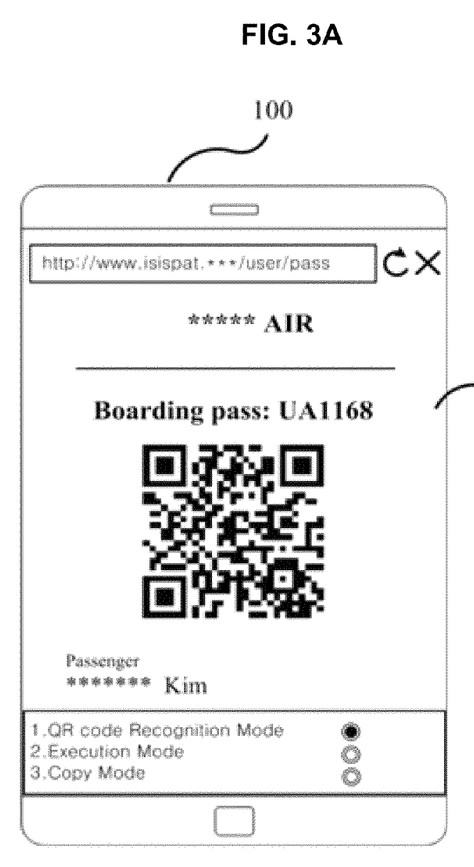
FIG. 3(A) and FIG. 3(B) illustrates an example in which a user sets a recognition mode to recognize a QR code displayed on a display device.
Figure 3B:
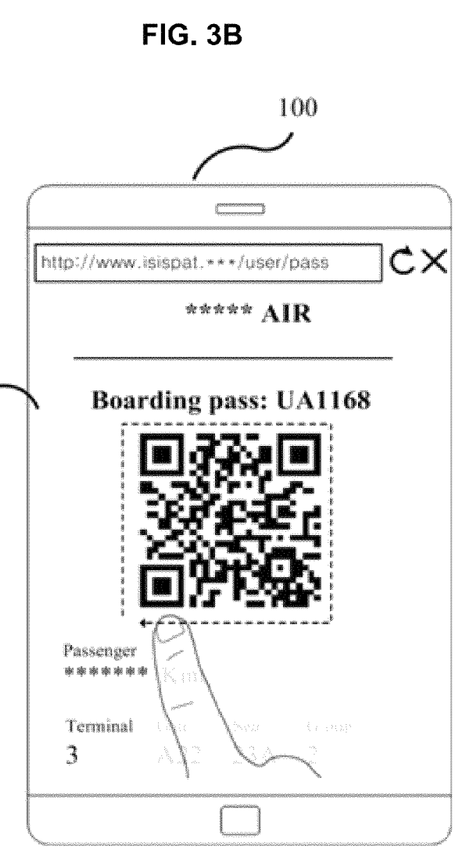

FIG. 3(A) and FIG. 3(B) illustrates an example in which a user sets a recognition mode to recognize a QR code displayed on a display device 120. FIG. 3(A) illustrates a case in which the user has selected "1. QR code Recognition Mode" through a menu bar shown in a lower portion of the display device 120. FIG. 3(B) illustrates a case in which the user inputs a gesture for selecting a region in which the QR code is shown with a quadrilateral. A mode setting shown in FIG. 3 is merely an example. When the user touches the QR code or inputs a specific gesture after making the mode setting, the computer device 100 recognizes the QR code.

In the recognizing step (530), the computer device 100 determines whether or not there is a standard QR code pattern in the image through image analysis.

Since it takes a long time to analyze all images displayed on the display device 120, it is preferable for the computer device 100 to detecting the QR code centering around a region indicated to have a QR code by the user through a touch or a gesture.

The recognizing step (530) may include a step in which, when the user touches the region in which the QR code is shown in the receiving step (520), the computer device 100 searches for a standard QR code pattern present in a search region while extending the search region centering on the region in which the touch input or the gesture input has been made in the image (531), and a step in which the computer device 100 recognizes the QR code based on the searched standard QR code pattern (532).

Figure 4A:
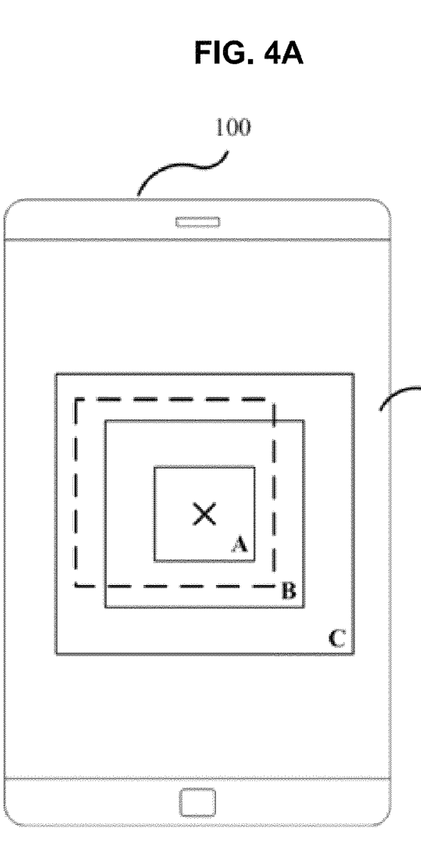
FIG. 4(A) and FIG. 4(B) illustrates an example of checking whether or not there is a QR code centering around a point touched by a user in a display device.
Figure 4B:
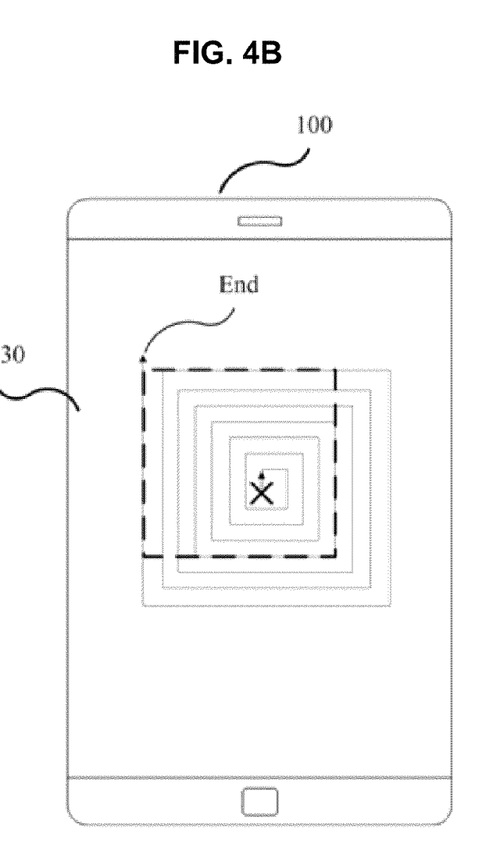

FIG. 4(A) and FIG. 4(B) illustrates an example of checking whether or not there is a QR code centering around a point touched by a user in a display device 120. In FIG. 4, a point indicated by X in the display device 120 denotes a point at which a touch input has been made. In other words, description will be made regarding a case in which the user has touched a region in which a QR code has been shown.

As shown in FIG. 4(A), in the step of searching for a standard QR code pattern (531), it may be determined whether there is a QR code while the search region is extended to predetermined sizes. Alternatively, in the step of searching for a standard QR code pattern (531), the computer device 100 may acquire data of the image per determining while moving a target pixel in a spiral direction from the central point of the region in which the touch input has been made, as shown in FIG. 4(B).

Extension of the region for determining whether or not there is a QR code is finished when a standard QR code pattern is detected. In FIG. 4, a region in which a QR code is shown is indicated by a quadrilateral dotted line. Referring to FIG. 4(A), the search region for detecting a QR code is extended in order of A, B and C, and the extension is finished when the search region becomes the region C including a region in which the QR code is shown. In FIG. 4(B), extension of the search region is made in a clockwise direction to acquire image data in units of one pixel, and the extension is finished at a point (indicated by "End") including the region in which the QR code is shown.

In addition to the methods illustrated in FIG. 4, various methods usable by those of ordinary skill in the art can be used to extend a region for determining whether or not there is a QR code.

Using a specific pattern constituting a QR code, it is possible to check whether or not there is a QR code in image data. Such a pattern is referred to as a standard QR code pattern. The computer device 100 analyzes whether or not there is the standard QR code pattern in a search region for detecting a QR code in image data.

Figure 5:
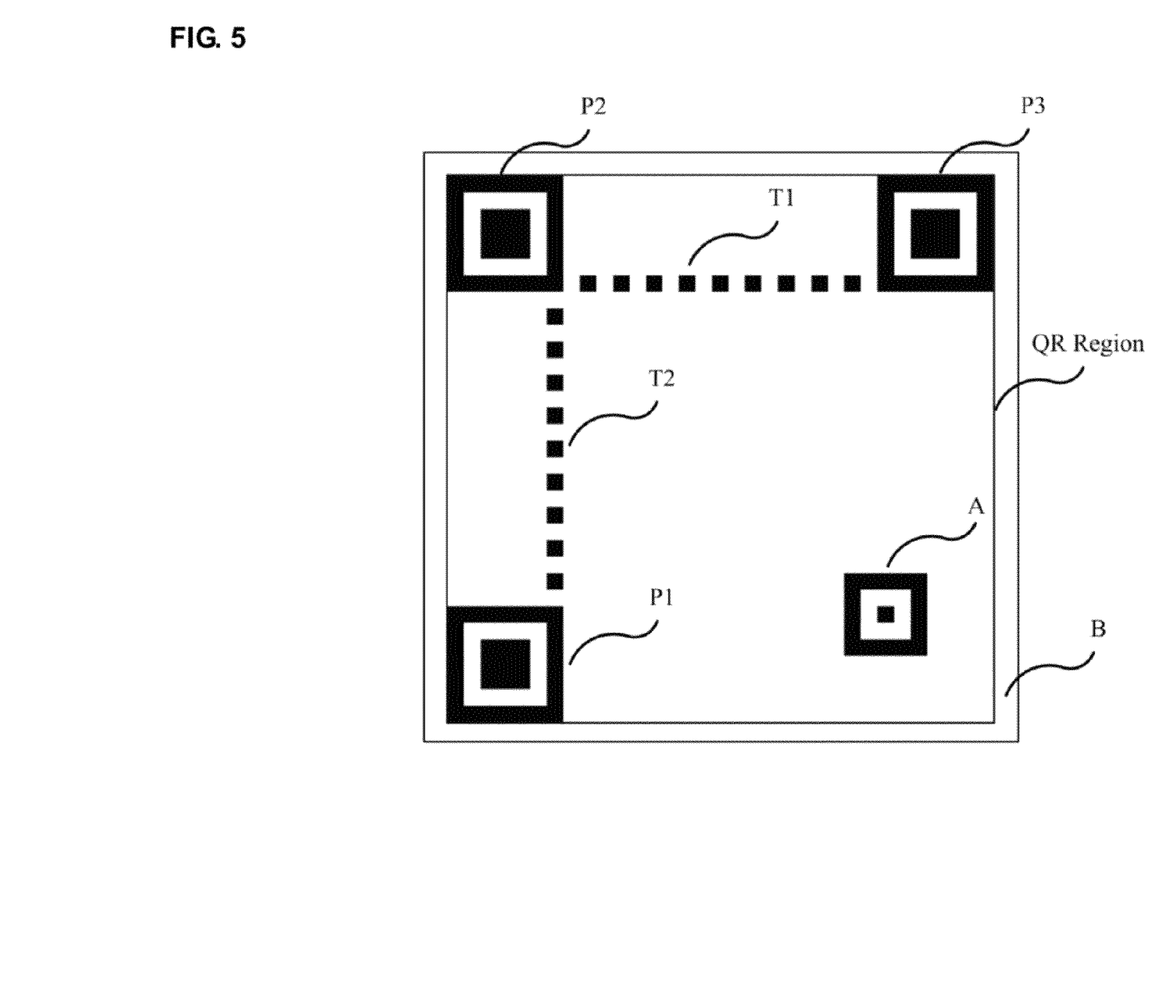
FIG. 5 illustrates an example of a QR code including a plurality of patterns.

FIG. 5 illustrates an example of a QR code including a plurality of patterns. A region constituting a QR code is indicated as a QR region. The QR code includes a plurality of position patterns P1, P2 and P3, timing patterns T1 and T2, an alignment pattern A, and a margin B surrounding the QR code with a predetermined length. The constitution of a QR code may slightly vary according to QR code versions and types, but a specific pattern for detecting the QR code is necessarily used. In the present invention, the computer device 100 may analyze whether or not such a standard QR code pattern is in image data, thereby determining whether or not there is a QR code. A detailed standard QR code pattern for image analysis can be checked in the QR code standard (International Standardization Organization (ISO)/International Electrotechnical Commission (IEC) 18004).

After recognizing a QR code in image data, the computer device 100 may execute a command stored in the QR code. For example, when the command stored in the QR code is to copy data stored in the QR code, the computer device 100 may store the data included in the QR code in the memory 115 of the computer device 100. Also, when the command stored in the QR code is a predetermined vibration pattern, the computer device 100 may interpret the vibration pattern command included in the QR code, and the computer device 100 or the display device 120 may vibrate according to the vibration pattern command. Commands stored in QR codes may be a variety of commands such as access to a specific web page, output of a specific image, and output of a specific sound.

It is preferable for the computer device 100 to convert a QR code shown in a web page, etc. into a touchable object. At this time, the touchable object becomes an object for executing a command stored in the QR code. The user may check QR code information by touching the touchable object corresponding to the QR code without photographing the QR code using an additional camera.

Figure 6A:
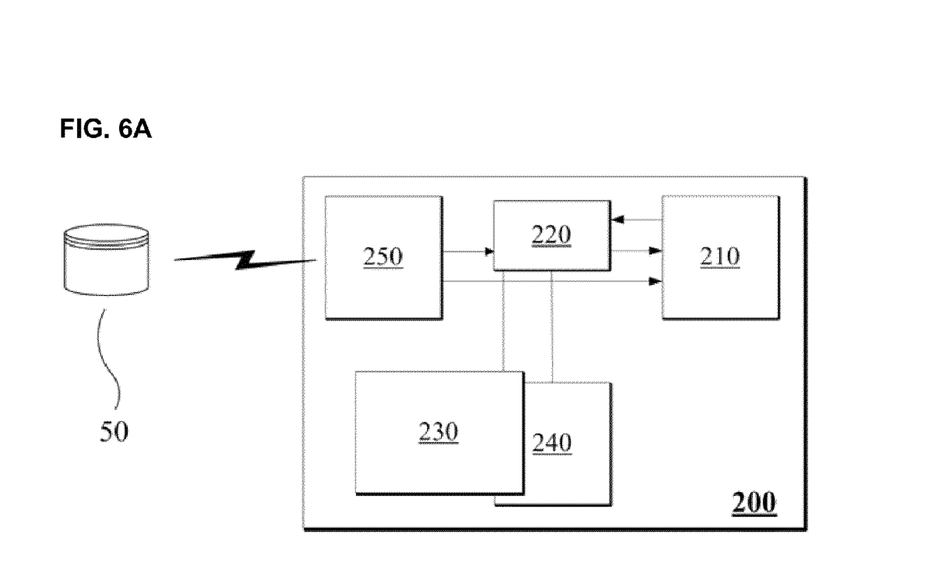
FIG. 6(A) and FIG. 6(B) are block diagrams illustrating examples of an apparatus for converting a QR code in content data into a touchable object.
Figure 6B:
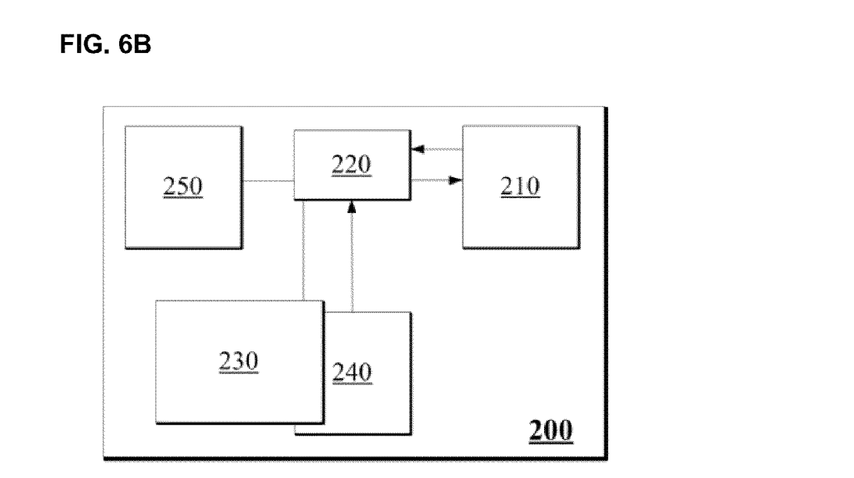

FIG. 6(A) and FIG. 6(B) are block diagrams illustrating examples of an apparatus for converting a QR code in content data into a touchable object. The converting apparatus 200 shown in FIG. 6 denotes a computer device or a server 300. In other words, a QR code may be converted into a touchable object in a mobile device such as a smart phone, or may be converted into a touchable object in a specific server and transferred to a terminal.

The apparatus 200 for converting a QR code in content data into a touchable object includes a memory 220 that stores content data including a QR code, a processor 210 that recognizes the QR code in the content data and converts the QR code in the content data into a touchable object for executing a command included in the QR code, and a communication module 250 that receives the content data. In addition, the converting apparatus 200 shown in FIG. 6 further includes a display device 230 and an input module 240 such as a touch panel.

Referring to FIG. 6(A), content data including a QR code is transmitted from a content server 50 to the converting apparatus 200. The communication module 250 receives the content data transmitted from the content server 50, and the received content data is stored in the memory 220 and then transferred to the processor 210, or directly transferred from the communication module 250 to the processor 210.

Referring to FIG. 6(B), content data including a QR code is stored in the memory 220 through the input module 240. The stored content data is transferred to the processor 210. In other words, FIG. 6(A) shows an example in which content data is input from the outside, and FIG. 6(B) shows an example in which content data is generated from the converting apparatus 200.

The processor 210 detects image data in the content data, and determines the QR code in the image data.

The processor 210 interprets a command corresponding to the recognized QR code, and may convert the code of the content data to convert the image into a touchable object for executing the command. A detailed process in which the converting apparatus 200 converts a QR code into a touchable object will be described later.

Unlike FIG. 6, the apparatus 200 for converting a QR code in content data into a touchable object may include the memory 220 that stores content data including a QR code, the processor 210 that recognizes the QR code in the content data and converts the QR code in the content data into a touchable object for executing a command included in the QR code, and the communication module 250 that transmits the content data including the converted QR code. In this case, the converting apparatus 200 transmits the convened content data to another terminal and so on.

Figure 7:
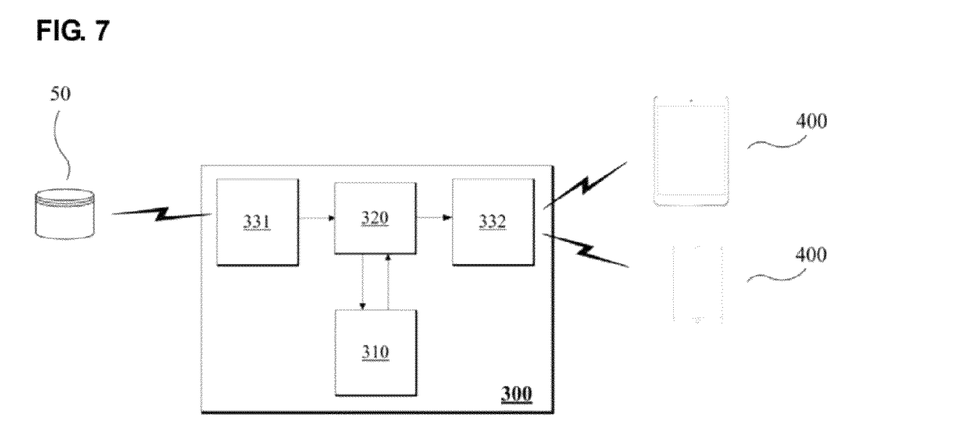
FIG. 7 is a block diagram illustrating an example of a server for converting a QR code in content data into a touchable object.

FIG. 7 is a block diagram illustrating an example of a server for converting a QR code in content data into a touchable object.

The converting server 300 includes a reception module 331 that receives content data including a QR code, a processor 310 that recognizes the QR code in the content data and converts the QR code in the content data into a touchable object for executing a command included in the QR code, a memory 320 that stores the content data received by the reception module 331 and the content data converted by the processor 310, and a transmission module 332 that transmits the content data including the converted QR code.

The reception module 331 receives the content data from a content server 50, and the content data including the converted QR code is transmitted to a terminal 400 such as a smart phone through the transmission module 332. Since the smart phone receives and decodes the converted content data, a user can see the touchable object rather than the QR code in a web page, or so on.

Figure 8:
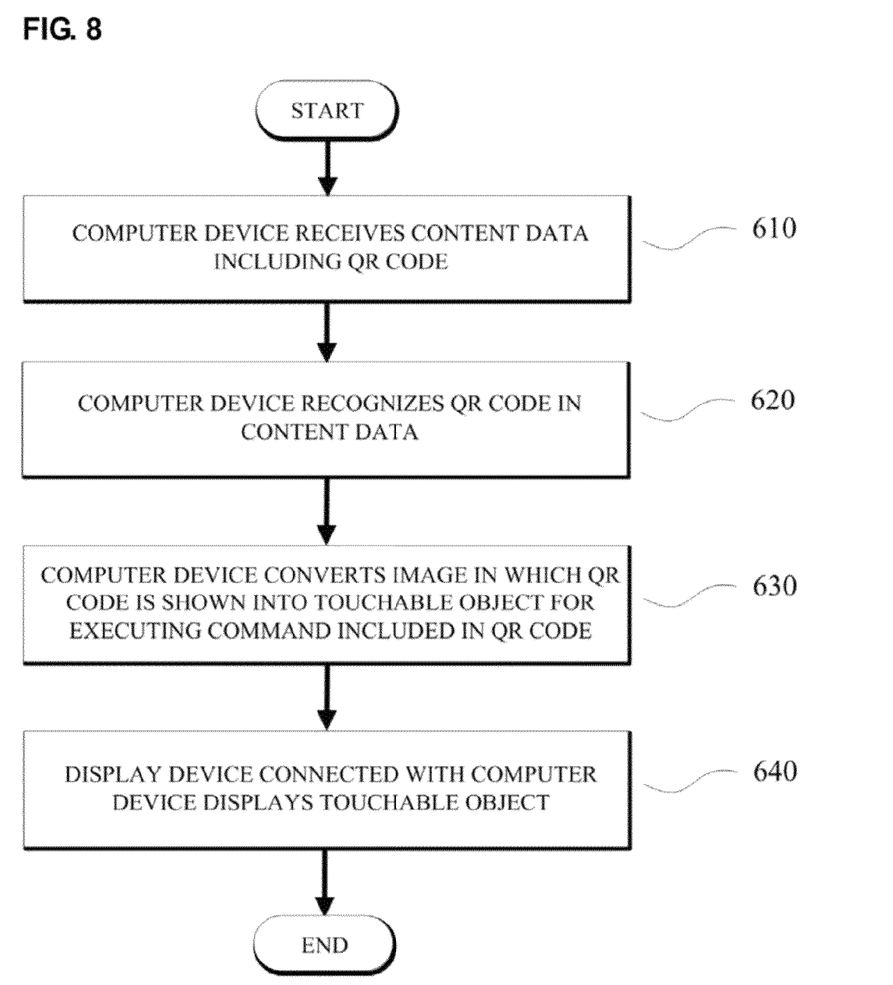
FIG. 8 is a flowchart illustrating an example of a method of converting a QR code in content data into a touchable object.

A conversion process performed by the converting apparatus 200 or the converting server 300 will now be described in detail. FIG. 8 is a flowchart illustrating an example of a method of converting a QR code in content data into a touchable object.

The method of converting a QR code in content data into a touchable object is performed through a step in which a computer device 200 or 300 receives content data including a QR code (610), a step in which the computer device 200 or 300 recognizes the QR code in the content data (620), and a step in which the computer device 200 or 300 converts an image in which the QR code is shown into a touchable object for executing a command included in the QR code (630). In the method of converting a QR code into a touchable object, a computer device denotes the above-described converting apparatus 200 or server 300. Although the converting apparatus 200 and server 300 are called the computer devices 200 and 300, respective calculation processes are actually performed by the processors 210 and 310.

The recognizing step (620) may include a step in which the computer device 200 or 300 detects image data in the content data (621), and a step in which the computer device 200 or 300 determines whether or not there is a QR code in the image data (622).

The detecting step (621) is a process of detecting image data first in content data including various pieces of content such as text, images and videos. For example, content such as a web page is encoded in Hypertext Markup Language (HTML), and in HTML, an image is defined using a specific tag such as "<img src="****">." Thus, in the detecting step (621), the computer device 200 or 300 needs to search HTML for the image tag only.

In the determining step (622), the computer device 200 or 300 determines whether or not there is a standard QR code pattern in the image data through image analysis. The determining step (622) is the same as in the above-described method of recognizing a QR code in image data.

The standard QR code pattern is at least one of a timing pattern, an alignment pattern, and a plurality of position patterns.

The converting step (630) may include a step in which the computer device 200 or 300 interprets the command corresponding to the recognized QR code (631), and a step in which the computer device 200 or 300 converts the code of the content data or interprets the code in a converted code to convert the image into a touchable object for executing the command (632).

To convert the QR code into a touchable object for displaying information stored in the QR code or executing the command, the computer device 200 or 300 first needs to check the information stored in the QR code or interpret the command stored in the QR code (631). Subsequently, the computer device 200 or 300 converts the code of the content data, so that the touchable object displays the information stored in the QR code or executes the command. Alternatively, the computer device 200 or 300 may directly decode the code corresponding to the QR code into a touchable object without converting the code.

When the content data is made up of HTML, the computer device 200 or 300 searches the HTML for a code for inserting the image (image tag) and recognizes the QR code in the recognizing step (620), the computer device 200 or 300 interprets the command of the QR code and then converts the inserting code into a code for a link to a touchable icon for executing the command in the converting step (630).

Figure 9A:
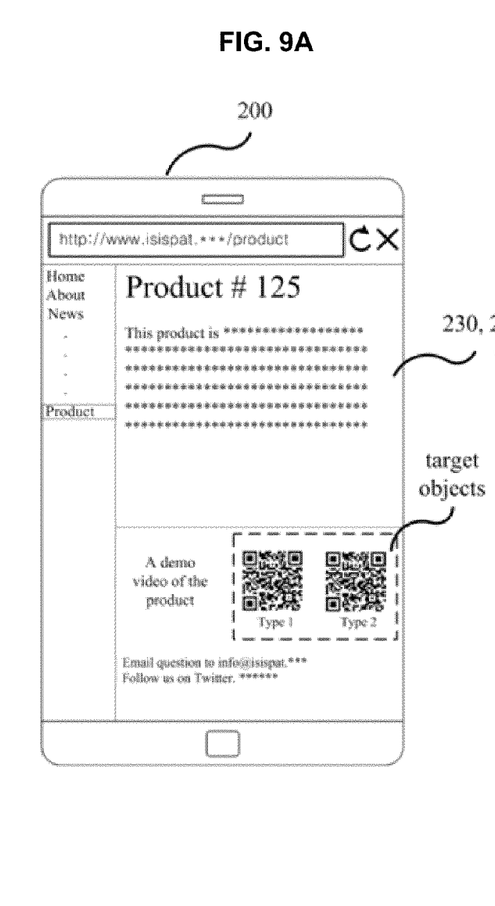
FIG. 9(A) illustrates an example in which content data including QR codes is displayed on a display device.
Figure 9B:
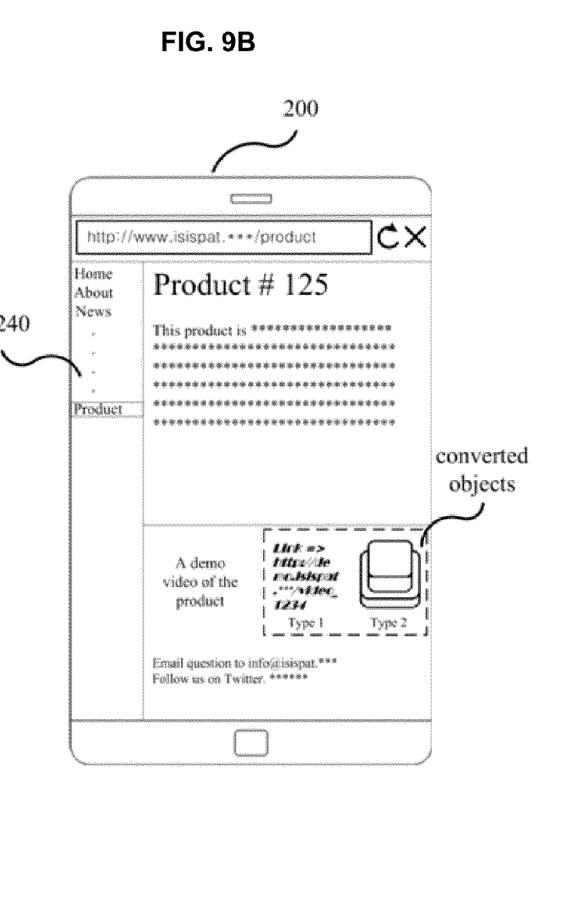
FIG. 9(B) illustrates an example in which the QR codes of FIG. 9(A) have been converted into touchable objects.

Those of ordinary skill in the art can modify various codes (HTML, JAVA, etc.) in which the computer device 200 or 300 defines content data so that an image is displayed as a touchable object. Thus, detailed description will be omitted. For example, in the case of HTML, a code '<img src="QRcode.jpg">' may be modified into '<a href="URL"><img src="Touch_button.jpg"></a>.'n example in which content data including QR codes is displayed on a display device, and FIG. 9(B) illustrates an example in which the QR codes of FIG. 9(A) have been converted into touchable objects. FIG. 9 illustrates the converting apparatus 200 as an example, and in the case of the converting server 300, content as shown in FIG. 9 will be displayed in the terminal 400 that receives converted content data.

FIG. 9(A) illustrates a web page for describing a specific product. QR codes shown in a lower portion of FIG. 9(A) are intended to introduce videos of the product. For convenience of description, type 1 and type 2 are shown. FIG. 9(B) shows an example in which the QR codes have been converted into touchable objects. Type 1 has been converted into a text link object linked to the address of a web page, and type 2 has been converted into a touchable button.

The method of converting a QR code in content data into a touchable object may further include a step in which the display device 230 or 400 connected with the computer device 200 or 300 displays the content data and the touchable object (640).

The touchable object is at least one of a QR code type, a text type, and a button type. The QR code type is the form of a touchable QR code image, the text type is the form of touchable text such as type 1 of FIG. 9(B), and the button type is the form of a touchable button such as type 2 of FIG. 9(B). In addition to these, various icons, a clickable button, etc, may be used as the touchable object.

Figure 10A:
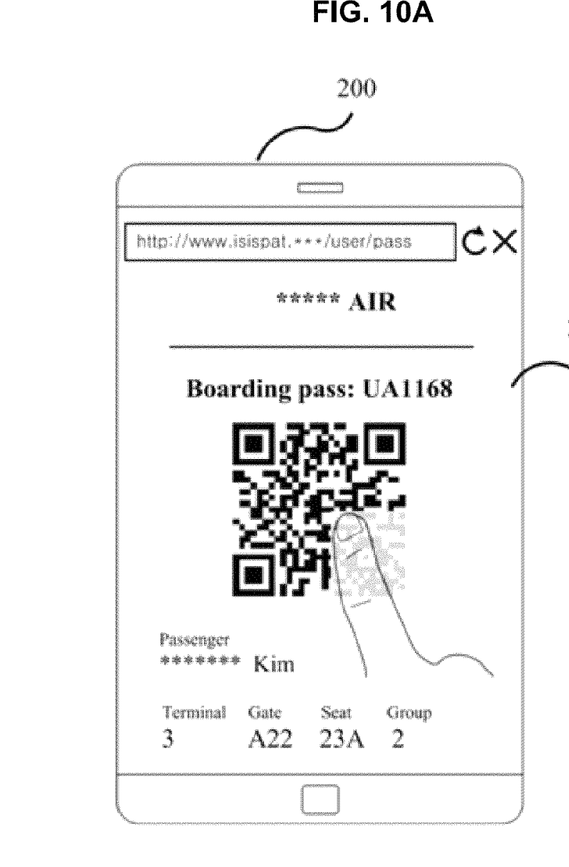
FIG. 10(A) illustrates an example in which a user touches a QR code displayed on a display device.
Figure 10B:
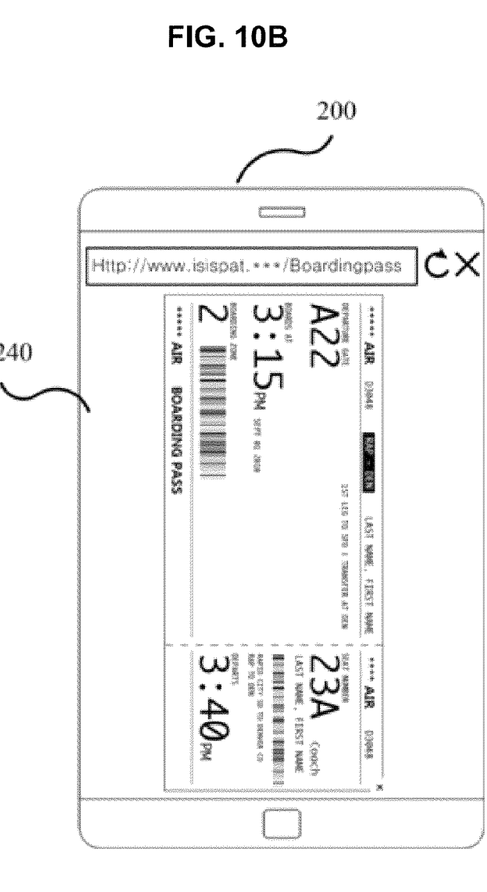
FIG. 10(B) illustrates an example in which a command stored in the QR code touched in FIG. 10(A) has been executed.

FIG. 10(A) illustrates an example in which a user touches a QR code displayed on a display device, and FIG. 10(B) illustrates an example in which a command stored in the QR code touched in FIG. 10(A) has been executed. FIG. 10(A) shows a process of touching a QR code related to information on a boarding pass, and FIG. 10(B) illustrates an image of the boarding pass displayed after the QR code is touched.

In the present invention, information stored in a QR code may be displayed, or a command may be executed in two ways. First, the computer device 100 recognizing a QR code may recognize a QR code in image data, and directly display information stored in the QR code or execute a command. Second, the computer device 200 or 300 converting a QR code may convert a QR code into a touchable object, and then a user may touch the touchable object displayed in a display device of the terminal, thereby displaying information stored in the QR code or executing a command.

Figure 11:
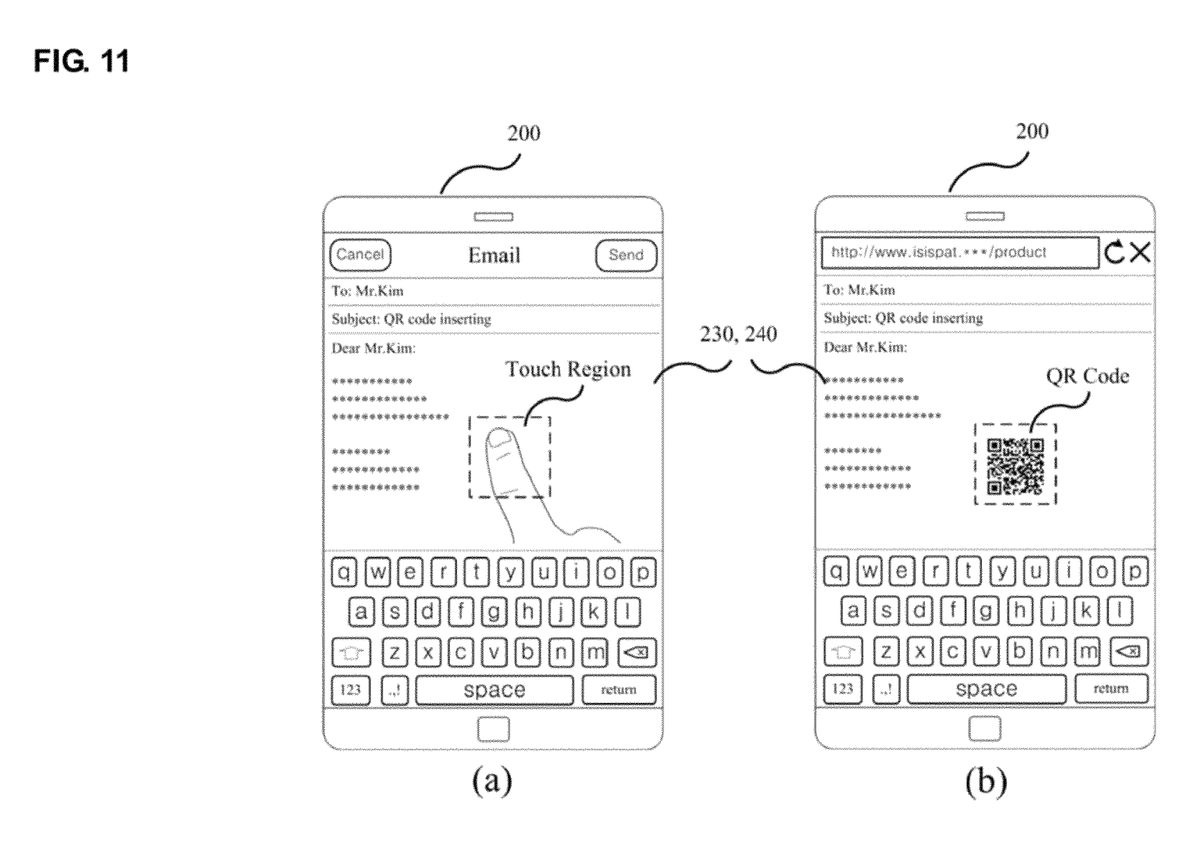
FIG. 11 illustrates an example of placing a QR code in content data displayed on a display device.

FIG. 11 illustrates an example of placing a QR code in content data displayed on a display device. This process is an example in which a QR code is placed in specific content data through the input module 240 in the converting apparatus 200 as shown in FIG. 6(B).

For example, when a user touches a specific point while writing an email on a device such as a smart phone as shown in FIG. 1(A), a QR code is placed at the point. The user transmits the email in which the QR code has been placed to his or her counterpart. The user may generate a QR code by touching a specific point or inputting a specific gesture after setting a QR code generation mode. The user may set the QR code generation mode in a menu of an application, or by inputting a specific gesture.

Figure 12:
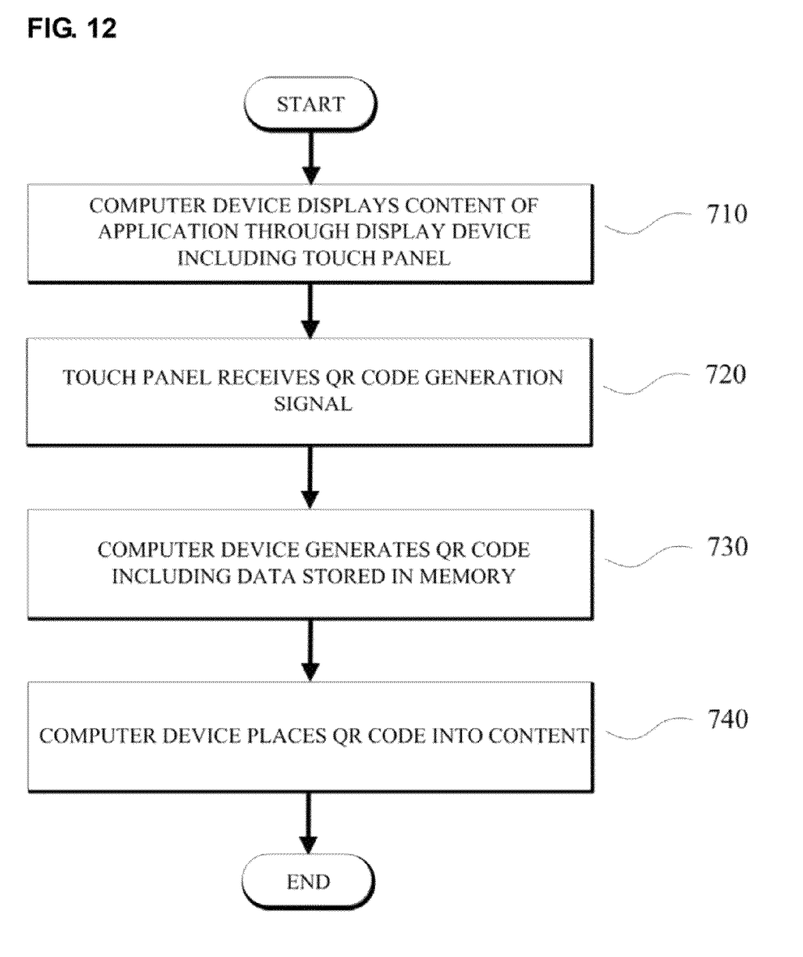
FIG. 12 is a flowchart illustrating an example of a method of generating content data including a QR code.

The user may set information to be stored in a QR code in advance. Information stored in QR codes includes text, image data, Internet protocol (IP) addresses, and so on. FIG. 12 is a flowchart illustrating an example of a method of generating content data including a QR code.

A method of generating content data including a QR code includes a step in which the computer device 200 displays content of an application through the display device 230 including a touch panel (710), a step in which the touch panel receives a QR code generation signal (720), a step in which the computer device 200 generates a QR code including data stored in the memory 220 (730), and a step in which the computer device 200 places the QR code in the content (740). In this case, the generated QR code contains specific data currently copied to the memory 220.

In the generating step (730), when the data exceeds the storage capacity of a QR code, the computer device 200 may store the data in a cloud server through wireless communication, and generate a QR code including a key for accessing the cloud server. Since the storage capacity of a QR code is limited to a predetermined value, when a large amount of data is placed, the computer device 200 stores information on a path along which the data is stored in the QR code.

The application is at least one of a mail application, a social networking service (SNS) application, a messenger application, and a web page building application, and in the placing step (740), the computer device 100 modifies the code of the content so that the QR code is included in the content as an image.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of recognizing a quick response (QR) code in a content data, comprising:

displaying, using a computer device, a visual content of a content data on a display device;

receiving, using the computer device, a signal for selecting a region in which the QR code is shown; and recognizing, using the computer device, the QR code based on an image data of a QR code in the content data, wherein the image data is identified by analyzing a computer code of the content data with the signal for the region.

2. The method of claim 1, wherein the signal is a touch signal for the region in which the QR code is shown, or a gesture for selecting the region in which the QR code is shown.

3. The method of claim 1, wherein the recognizing the QR code includes:
   Identifying an information of the image data of the QR code in the computer code, wherein the QR code is displayed within the region, and
   Recognizing the QR code by image processing of the image data.

4. The method of claim 1, wherein the recognizing the QR code includes recognizing, using the computer device, the QR code based on a standard QR code pattern in the image data.

5. The method of claim 4, wherein the standard QR code pattern is at least one of a timing pattern, an alignment pattern, and a plurality of position patterns.

6. The method of claim 1, wherein the computer code is at least one of Hypertext Markup Language and JAVA Language.

7. The method of claim 1, further comprising receiving, using the computer device, the content data of digital content from a server via a network.

8. The method of claim 1, wherein the QR code is included in a web page displayed on the display device or content of an application.

9. A method of recognizing information of a quick response (QR) code in a content data, comprising:
   detecting, by a computer device, an image data of the QR code from a received content data by analyzing a computer code of a content data; and
   determining, by the computer device, an information which is represented in the image data of QR code.

10. The method of claim 9, wherein the computer code is at least one of Hypertext Markup Language and JAVA Language.

11. The method of claim 9, wherein the determining the information comprises recognizing, by the computer device, the QR code based on a standard QR code pattern in the image data and extracting the information from the recognized QR code.

12. The method of claim 11, wherein the standard QR code pattern includes at least one of a timing pattern, an alignment pattern, and a plurality of position patterns.

13. The method of claim 9, wherein the QR code is included in a web page displayed on the display device or content of an application.

14. The method of claim 9, further comprising:
   converting, by the computer device, the image data into a data of touchable object for executing a command included in the information.

15. The method of claim 14, wherein said converting the image comprises:
   interpreting the command corresponding to the information of the QR code; and
   converting a part of the computer code of the content data to convert the image data into the data of touchable object for executing the command.

16. The method of claim 14, further comprising:
   receiving, by the computer device, a signal for the converting the image data into the data of touchable object.

17. The method of claim 14, further comprising:
   displaying, by the computer device, the touchable object on a display device.

18. The method of claim 9, further comprising:
   displaying, by the computer device, the QR code which is included in the content data on a display device.

19. The method of claim 9, further comprising:
   receiving, by the computer device, the content data of digital content from a server via a network.

* * * * *